United States Patent
Ishii et al.

(10) Patent No.: US 8,107,823 B2
(45) Date of Patent: Jan. 31, 2012

(54) OPTICAL TRANSMISSION MODULE

(75) Inventors: Hiroyoshi Ishii, Yokohama (JP);
Toshikazu Ohtake, Yokohama (JP);
Osamu Yamada, Hiratsuka (JP);
Fumihide Maeda, Odawara (JP);
Satoshi Motohiro, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 630 days.

(21) Appl. No.: 11/637,884

(22) Filed: Dec. 13, 2006

(65) Prior Publication Data

US 2007/0154224 A1 Jul. 5, 2007

(30) Foreign Application Priority Data

Dec. 13, 2005 (JP) .................................. 2005-358808

(51) Int. Cl.
*H04B 10/00* (2006.01)
*G02B 6/36* (2006.01)

(52) U.S. Cl. ........ 398/141; 398/140; 398/164; 398/182; 398/200; 398/201; 398/214; 398/135; 385/25; 385/39; 385/76; 385/88; 385/90; 385/92; 385/139

(58) Field of Classification Search .................. 398/164, 398/140, 135, 141, 182, 200, 201, 214; 385/86, 385/139, 25, 39, 60, 76, 88–92; 439/160, 439/74, 75, 157
See application file for complete search history.

(56) References Cited

U.S. PATENT DOCUMENTS

| | | | |
|---|---|---|---|
| 5,138,679 A | | 8/1992 | Edwards et al. |
| 5,738,538 A | * | 4/1998 | Bruch et al. .................. 439/160 |
| 5,802,230 A | * | 9/1998 | Kuribayashi et al. .......... 385/92 |
| 6,071,016 A | | 6/2000 | Ichino et al. |
| 6,086,265 A | * | 7/2000 | Kuribayashi et al. .......... 385/92 |
| 6,402,388 B1 | * | 6/2002 | Imazu et al. .................... 385/60 |
| 2004/0208459 A1 | * | 10/2004 | Mizue et al. .................... 385/92 |

FOREIGN PATENT DOCUMENTS

| | | | |
|---|---|---|---|
| JP | 10-160966 | | 6/1998 |
| JP | 10-170759 | | 6/1998 |
| JP | 10-170763 | | 6/1998 |
| JP | 10-246869 | | 9/1998 |
| JP | 10-247740 | | 9/1998 |
| JP | 10-247742 | | 9/1998 |
| JP | 11-202166 | * | 7/1999 |
| JP | 11-337770 | | 12/1999 |
| JP | 2002-277693 | | 9/2002 |
| JP | 2005-309028 | * | 11/2005 |

OTHER PUBLICATIONS

Extended European Search Report issued in European Application No. 06025236.8 on May 10, 2010.
Office Action in JP 2005-358808, dated Jan. 25, 2011 [in Japanese, 2 pgs.].

* cited by examiner

*Primary Examiner* — Li Liu

(74) *Attorney, Agent, or Firm* — Antonelli, Terry, Stout & Kraus, LLP.

(57) ABSTRACT

In an optical transmission module having a communication module which is freely movable in a case, when a tensile force is generated on an optical cable after connection of an optical transmission module, optical coupling surface and an optical axis center follow each other and thus stable optical transmission can be constantly performed.

5 Claims, 10 Drawing Sheets

OPTICAL TRANSMISSION MODULE

CLAIM OF PRIORITY

The present application claims priority from Japanese patent application serial no. 2005-358808, filed on Dec. 13, 2005, the content of which is hereby incorporated by reference into this application.

BACKGROUND OF THE INVENTION

The present invention relates to an optical transmission module, and particularly to a receptacle-type optical transmission module having an optical transmitter module or an optical receiver module.

A receptacle-type optical transmission module is configured such that a coaxial can package or box-type package in which a light emitting element or a light receiving element is stored and sealed and a circuit substrate in which electronic components are implemented (a transmission control circuit of a peripheral circuit of the light emitting element or the light receiving element) are stored in one case. The receptacle-type optical transmission module also has a receptacle-type optical connector integrally formed with the case so as to connect an optical transmission plug to the coaxial can package or box-type package from the outside. The optical transmitter module or optical receiver module of the coaxial can package or box-type package is fixed to the case. Such a receptacle-type optical transmission module is described in Patent References 1 to 3. Here, Patent Reference 1 is the US counterpart of Patent References 2 and 3.

Patent References 4 and 5 describe an optical semiconductor module having a movable ferrule. Further, Patent References 6 to 9 describe an optical connector which is characterized in the configuration of a hook.

Incidentally, in the present specification, the optical transmitter module and the optical receiver module are collectively referred to as an optical communication module.

FIG. 1 is a partial cross-sectional view of an optical transmission module case storing an optical communication module. In FIG. 1, an optical communication module 300 is stored in an optical transmission module case 15 having a receptacle part 5 for connecting an optical transmission plug from the outside of the optical transmission module. The optical communication module 300 is provided inside with optical coupling surface 700 for optical coupling with a ferrule end of the optical transmission plug that is connected from the outside of the optical transmission module. In the case of a receptacle for an SC connector, the optical transmission module case 15 has a hook part 15a for holding the SC connector. An inner position of the hook part 15a is referred to as a mechanical reference surface. Further, the optical coupling surface through which light can be coupled and transmitted when the optical transmission plug and the optical communication module 300 are connected is referred to as an optical reference surface. The distance between the mechanical reference surface and the optical reference surface is 7.0±0.1 mm. This distance is referred to as E dimension. Although the optical transmission plug is not shown in FIG. 1 for ease of illustration, the real E dimension is the distance between the inner position of the hook and the optical coupling surface of the optical communication module when the optical transmission plug is inserted into the optical transmission module. This is common to the whole description in this specification.

FIG. 2 is a partial cross-sectional view of an optical transmission module case storing the optical communication module and a hook part. In FIG. 2, the optical communication module 300 is stored in an optical transmission module case 16, together with the receptacle part 5 for connecting the optical transmission plug from the outside of the optical transmission module and a hook part 30 for holding the optical transmission plug. The difference between the optical transmission module of FIG. 2 and the optical transmission module of FIG. 1 is that the hook part is separate from the optical transmission module case or integrally formed therewith. The dimensional relationship in FIG. 2 is the same as in FIG. 1.

FIG. 3 is a partial cross-sectional view of an optical transmission module case storing an optical communication module for LC connector. In FIG. 3, an LC connector-type optical communication module 350 is stored in an optical transmission module case 17 having a receptacle part 7 for connecting an optical transmission plug from the outside of the optical transmission module. The optical communication module 350 is provided inside with optical coupling surface 750 for optical coupling with a ferrule end of the optical transmission plug that is connected from the outside of the optical transmission module. The LC connector has a hook mechanism for holding the optical transmission plug. The held position of the hook mechanism is referred to as the mechanical reference surface. Further, the optical coupling surface through which light can be coupled and transmitted when the optical transmission plug and the optical communication module 350 are connected is referred to as the optical reference surface. The distance between the mechanical reference surface and the optical reference surface is 9.95±0.05 mm. This distance is referred to as B dimension.

[Patent Reference 1] U.S. Pat. No. 6,071,016.
[Patent Reference 2] Japanese Patent Application Publication No. Hei 10-247740.
[Patent Reference 3] Japanese Patent Application Publication No. Hei 10-247742.
[Patent Reference 4] Japanese Patent Application Publication No. Hei 10-246839.
[Patent Reference 5] Japanese Patent Application Publication No. Hei 11-337770.
[Patent Reference 6] Japanese Patent Application Publication No. 2005-309028.
[Patent Reference 7] Japanese Patent Application Publication No. Hei 10-170759.
[Patent Reference 8] Japanese Patent Application Publication No. Hei 10-160966.
[Patent Reference 9] Japanese Patent Application Publication No. HEI 10-170763.

The optical transmitter module or optical receiver module described in the above Patent References 1 to 3 is fixed to a case of the optical transmission module. Further, the optical transmission plug connected to the optical transmission module has an optical fiber at the back. In a device with the optical transmission module mounted thereon, a tensile force may be applied to the optical fiber in order to bundle many optical fibers. Because of the tensile force, stress is applied to the ferrule of the optical transmission plug, which is likely to prevent the light from being coupled or likely to cause damage of the optical transmitter module or optical receiver module.

SUMMARY OF THE INVENTION

The present invention provides a receptacle-type optical transmission module that reduces the external influence of a tensile force on the optical fiber and maintains the optical coupling of the optical transmitter module or optical receiver module.

The solution of the above described problems is achieved by an optical transmission module including: a communication module part for converting an electrical signal to an optical signal or converting an optical signal to an electrical signal; and a case for movably holding the communication module and having a hook part for positioning an optical plug that is connected to the communication module, wherein the distance in an optical axis direction between the hook part and an light coupling surface of the communication module part is in a predetermined range when the optical plug is connected to the optical communication module part.

Further, it is achieved by an optical transmission module including: a transmission module part for converting an electrical signal to an optical signal or converting an optical signal to an electrical signal; and a case for holding the transmission module, wherein when an optical plug is connected to the communication module part and stress is applied to the optical plug, the communication module moves while maintaining optical coupling with the optical plug.

Further, it is achieved by an optical transmission module including: a communication module part for converting an electrical signal to an optical signal or converting an optical signal to an electrical signal; and a case for movably holding the communication module, wherein when an optical plug is connected to the communication module part, the communication module is positioned by the optical plug.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Hereinafter, a mode for carrying out the invention will be described by way of embodiments with reference to the drawings. Incidentally, same parts are given same reference numbers and their description will not be repeated.

Embodiment 1

Figure 1:
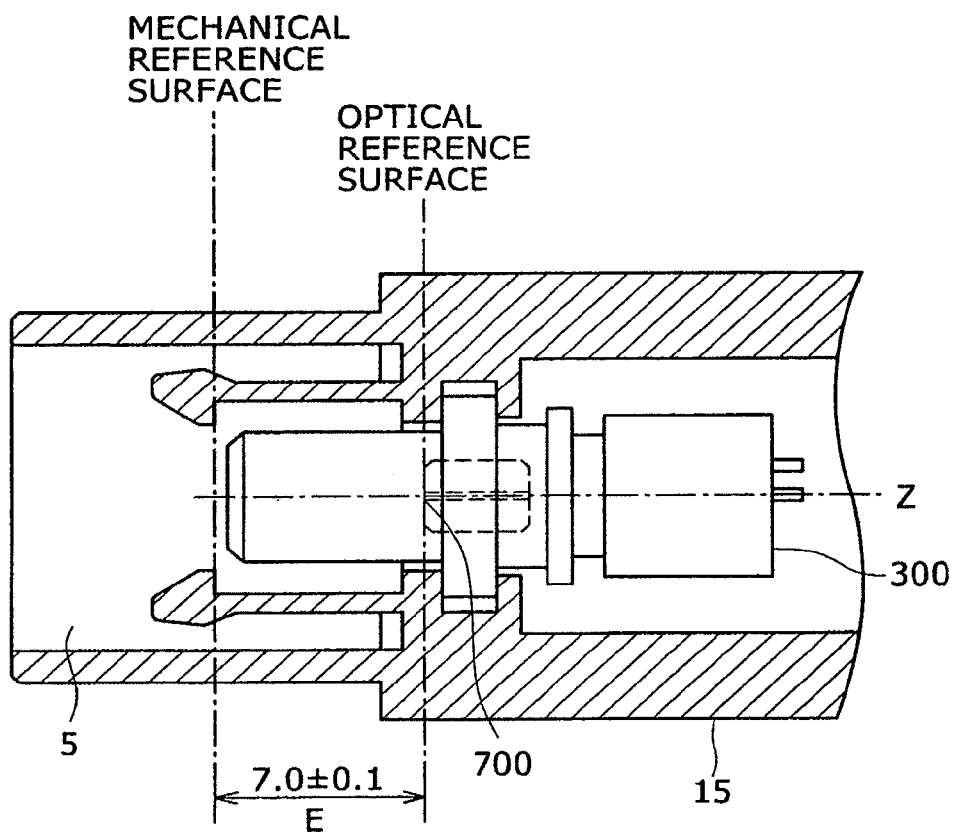
FIG. 1 is a partial cross-sectional view of an optical transmission module case storing an optical communication module.
Figure 2:
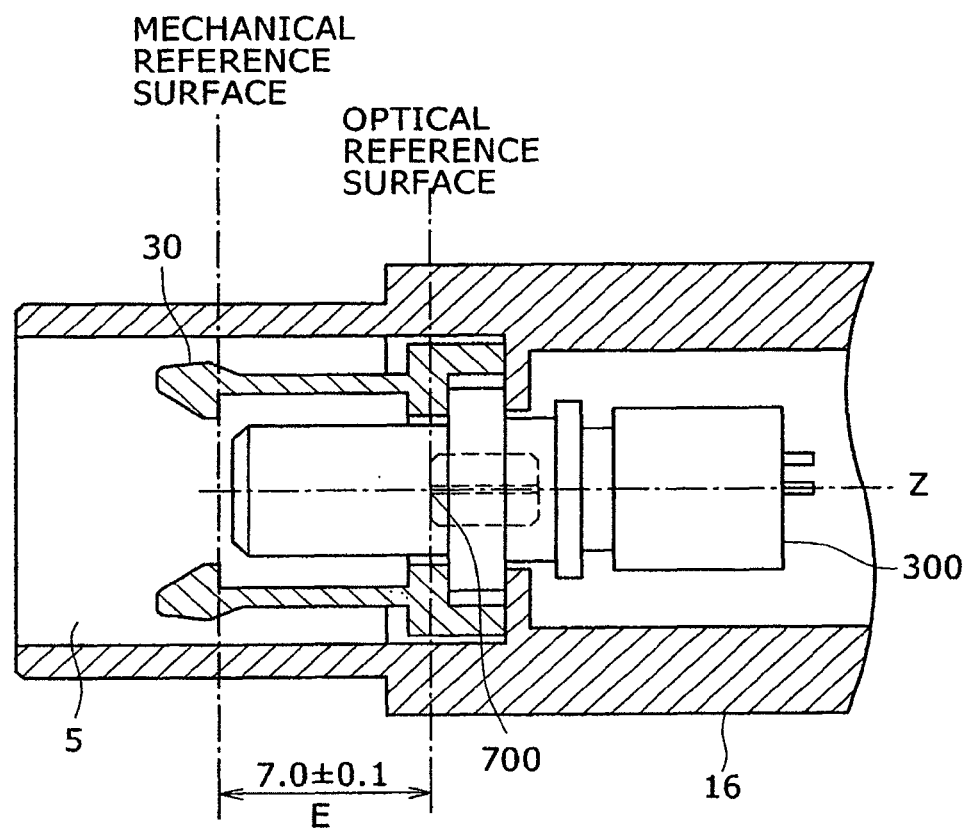
FIG. 2 is a partial cross-sectional view of an optical transmission module case storing the optical communication module and a hook part.
Figure 3:
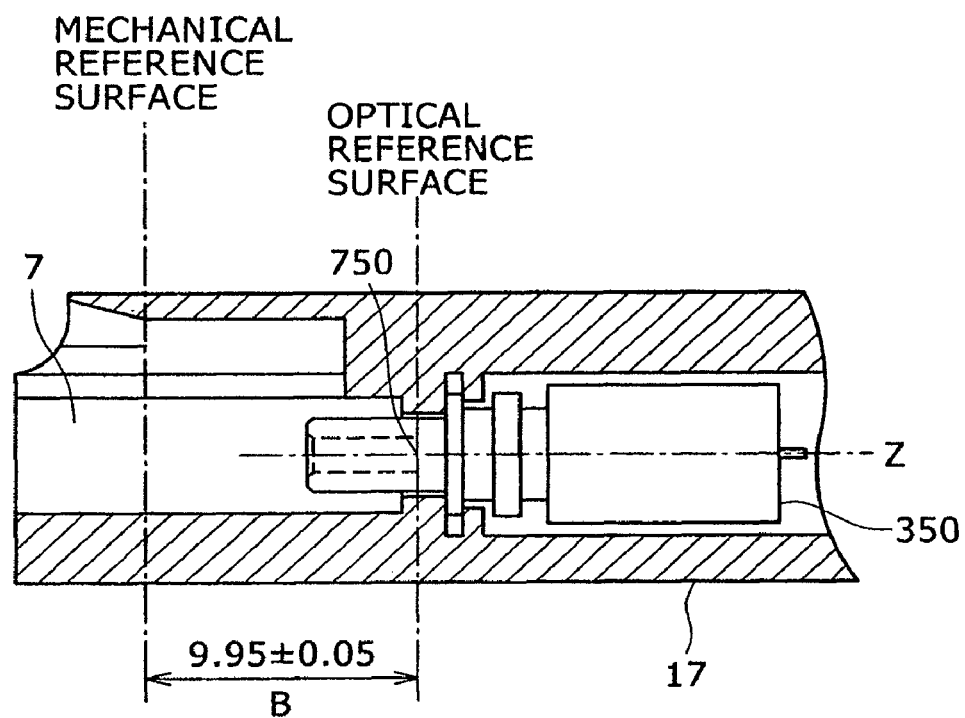
FIG. 3 is a partial cross-sectional view of an optical transmission module case storing an optical communication module for LC connector.
Figure 4:
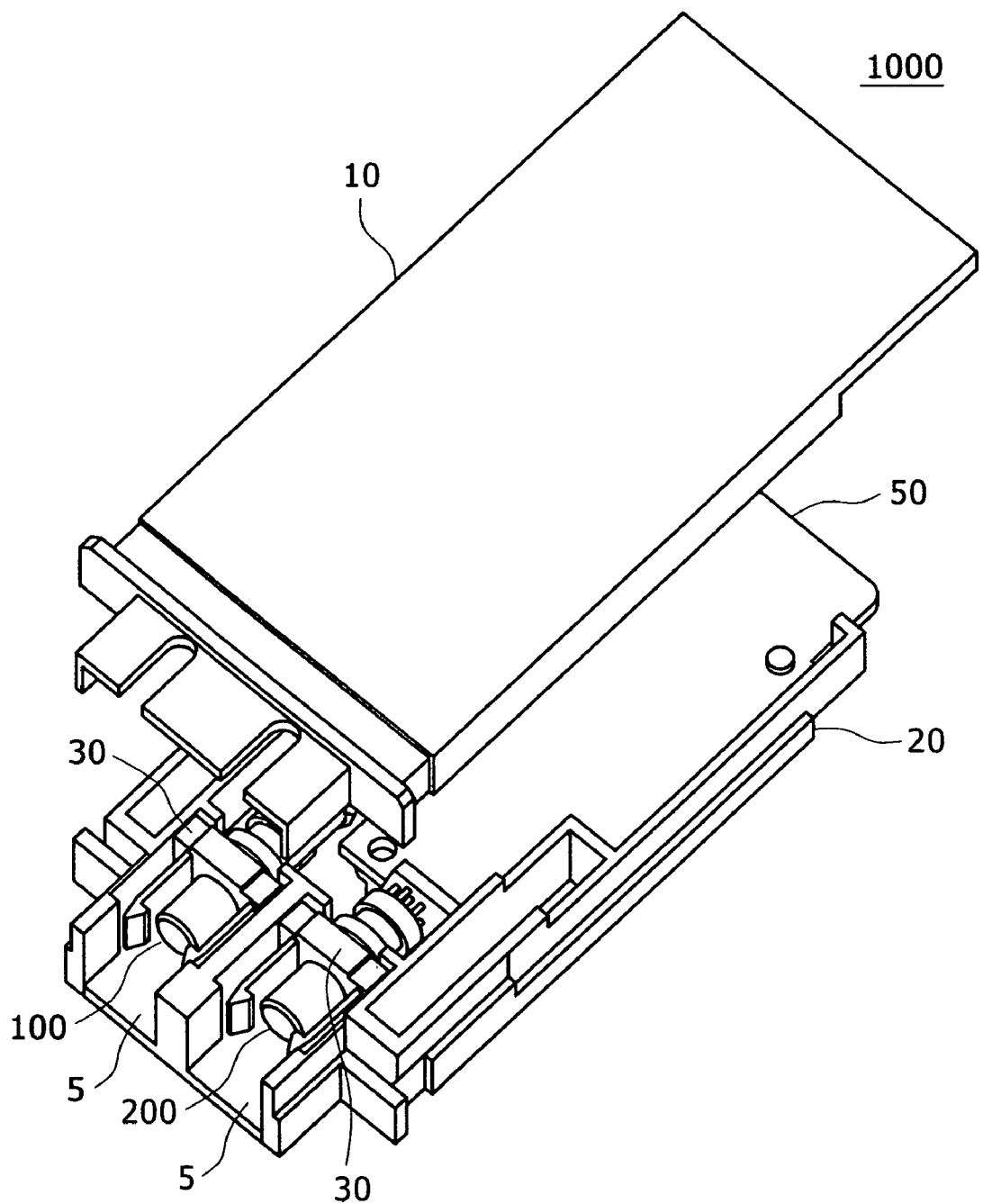
FIG. 4 is a perspective view illustrating the configuration of an optical transmission module.

FIG. 4 is a perspective view illustrating the configuration of an optical transmission module. In FIG. 4, an optical transmission module 1000 is configured to have an optical transmitter module 100, an optical receiver module 200, a printed board 50 in which control circuits for the respective modules 100, 200 are implemented, a receptacle part 5 for connecting an optical transmission plug not shown from the outside of the optical transmission module 1000, and a hook part 30 for holding an optical transmission plug, all of which are stored between an upper case 10 and a lower case 20.

Figure 5:
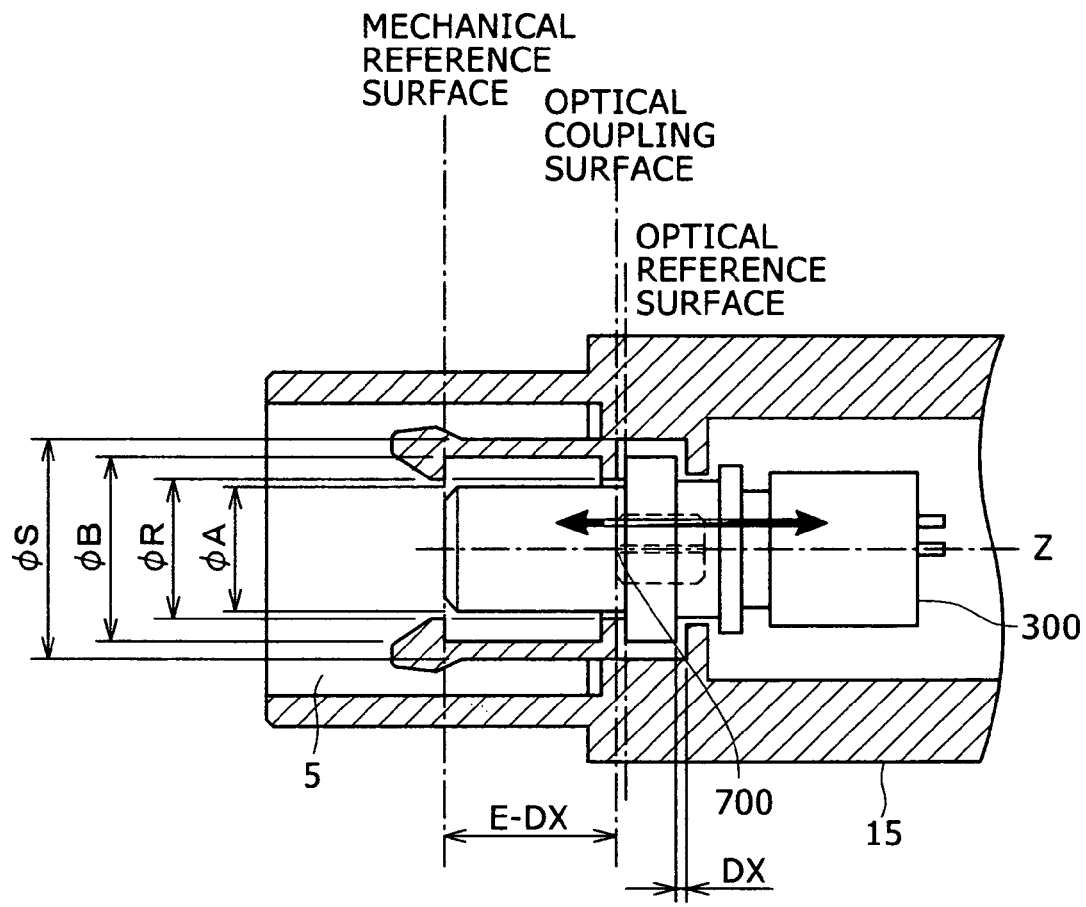
FIG. 5 is a partial cross-sectional view of the optical transmission module case storing the optical communication module movable in an optical axis direction.

FIG. 5 is a partial cross-sectional view of the optical communication module case storing the optical communication module which is movable in an optical axis direction. In FIG. 5, the optical communication module 300 is stored in an optical transmission module case 15 having the receptacle part 5 for connecting the optical transmission plug from the outside of the optical transmission module. The optical communication module 300 and the optical transmission module case 15 have a distance DX therebetween parallel to the Z-axis, as well as "φA<φR" and "φB<φS" within the X-Y surface as the relations between the outer diameters of the optical communication module 300 and between the inner diameters of the transmission module case 15. As a result, the optical communication module 300 can move backward and forward along the Z-axis which is the optical axis direction. In the case where the distance between the optical communication module 300 and the optical transmission module case 15 is "DX", the distance between the mechanical reference surface and optical coupling surface 700 of the optical communication module 300 is "E-DX".

Figure 6:
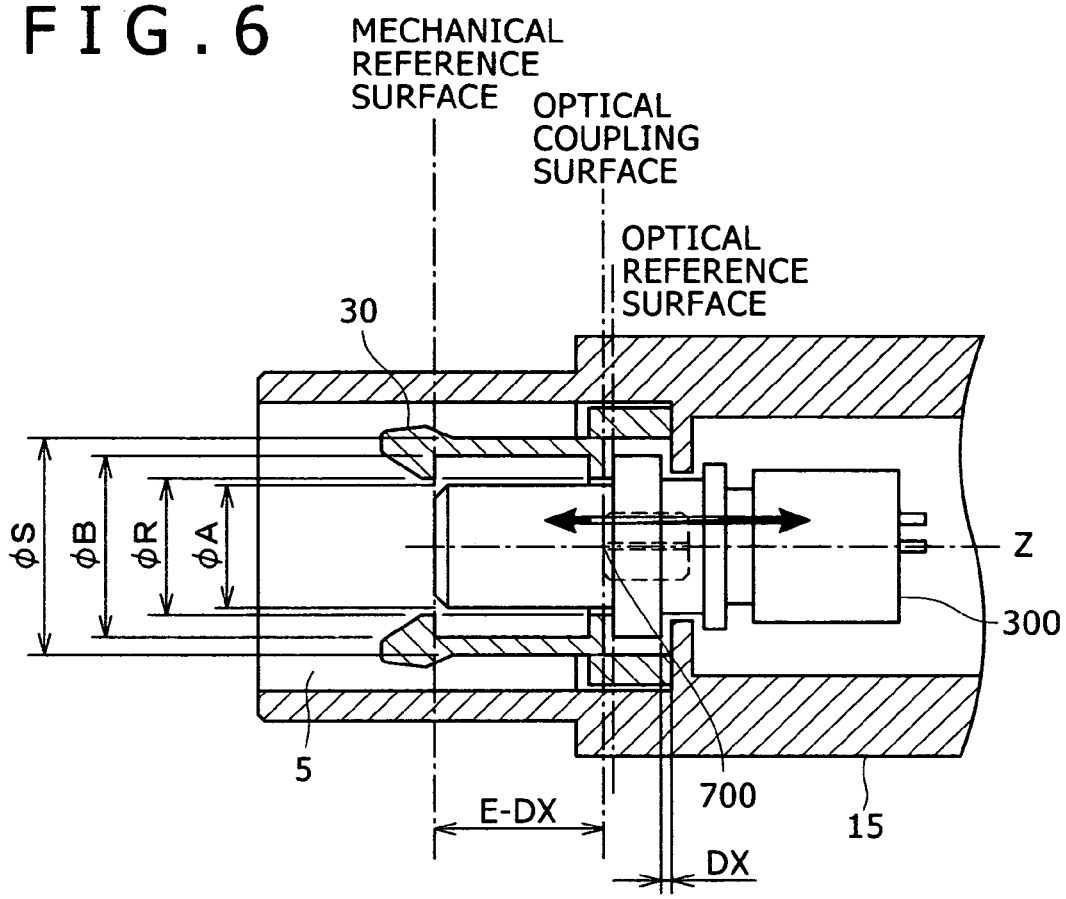
FIG. 6 is a partial cross-sectional view of the optical transmission module case storing the optical communication module movable in the optical axis direction and the hook part.

FIG. 6 is a partial cross-sectional view of the optical transmission module case storing the optical communication module movable in the optical axis direction and the hook part. In FIG. 6, the optical communication module 300 is stored in the optical transmission module case 16, together with the receptacle part 5 for connecting the optical transmission plug from the outside of the optical transmission module and the hook part 30. The difference between the optical transmission module of FIG. 6 and the optical transmission module of FIG. 5 is that the hook part is separate from the optical transmission module case or integrally formed therewith. The dimensional relationship and the movable direction in FIG. 6 are the same as in FIG. 5.

According to the present embodiment, it is possible to maintain the optical coupling of the optical transmission module as long as the amount of Z-direction deformation of the hook is equal to or less than DX, even if a tensile force to deform the hook in the −Z direction is applied in the state where the optical transmission plug is inserted therein. Thus it is possible to obtain a receptacle-type optical transmission module that reduces the external influence of a tensile force on the optical fiber in the −Z direction and maintains the coupling of light.

Embodiment 2

Figure 7:
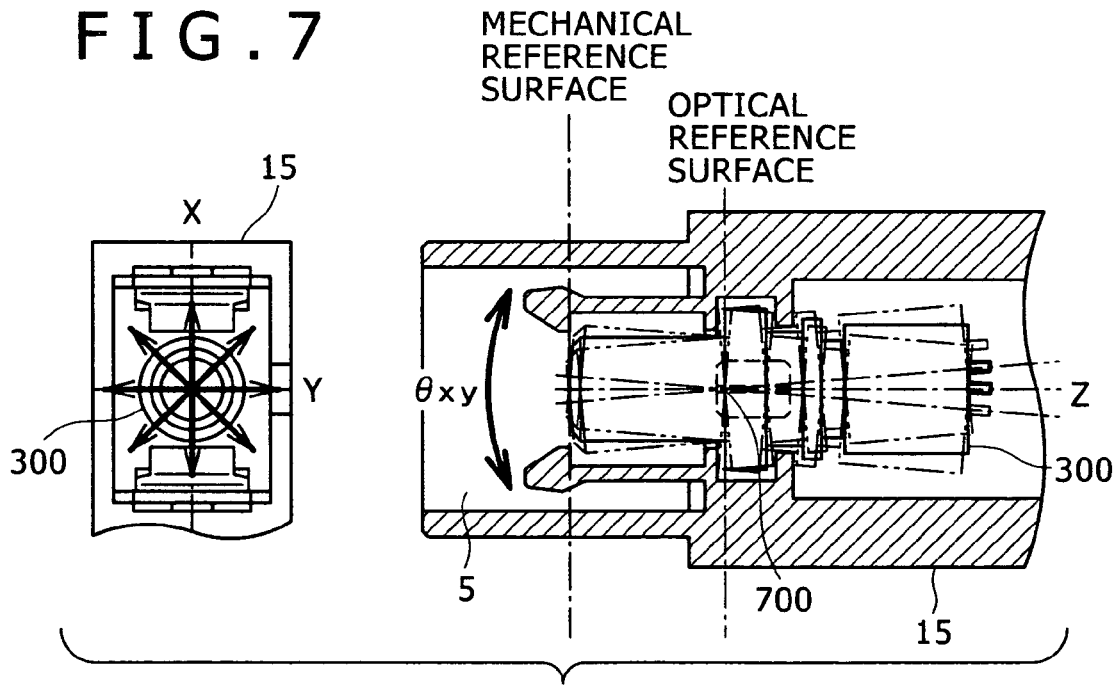
FIG. 7 is a partial cross-sectional view of the optical transmission module case storing the optical communication module which is movable in the X, Y, Z and θxy directions.

FIG. 7 is a partial cross-sectional view of the optical transmission module case storing the optical transmission module which is movable in the X, Y, Z and θxy directions. In FIG. 7, the optical communication module 300 is stored in the optical transmission module case 15 having the receptacle part 5 for connecting the optical transmission plug from the outside of the optical transmission module. The optical communication module 300 and the optical transmission module case 15 have a distance therebetween. Compared with Embodiment 1, the value of the distance DX parallel to the Z-axis is increased and the values of "φR−φA" and "φS−φB" are also increased. As a result, the optical communication module 300 can move in the X and Y directions that are orthogonal to the Z-axis as the optical axis direction, in the Z direction as the optical axis direction and in the θxy direction as the rotation direction. These moving directions of the communication module are closer to the connector direction than a surface perpendicular to the optical axis.

Figure 8:
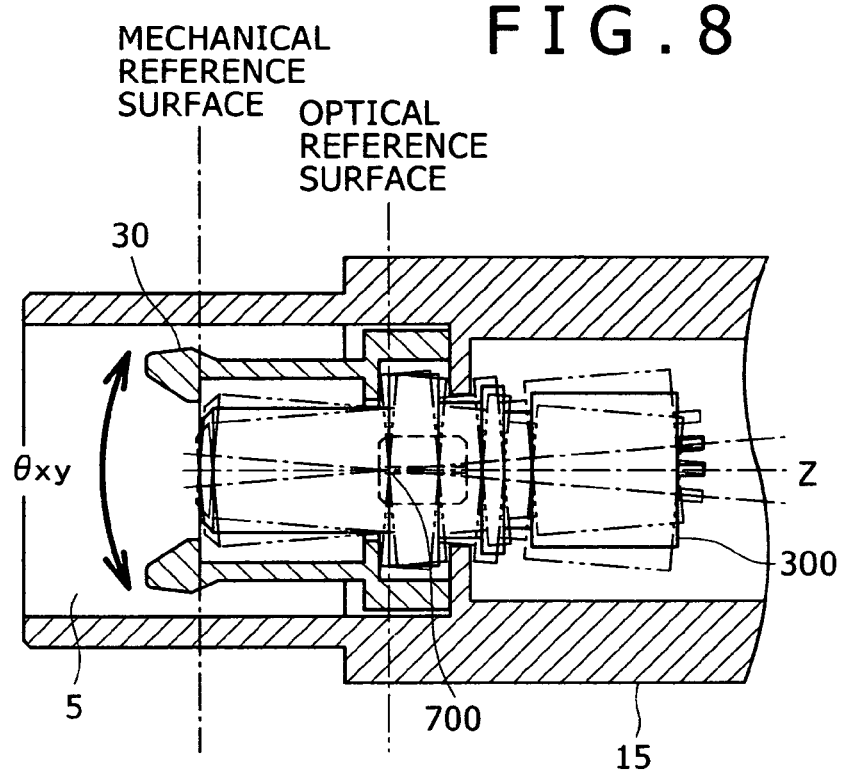
FIG. 8 is a partial cross-sectional view of the optical transmission module case storing the optical communication module movable in the X, Y, Z and θxy directions and the hook part.

FIG. 8 is a partial cross-sectional view of the optical transmission module case storing the optical communication module movable in the X, Y, Z and θxy directions and the hook part. In FIG. 8, the optical communication module 300 is stored in the optical transmission module case 16, together with the receptacle part 5 for connecting the optical transmission plug from the outside of the optical transmission module and the hook part 30 for holding the optical transmission plug. The difference between the optical transmission module of FIG. 8 and the optical transmission module of FIG. 7 is that the hook part is separate from the optical transmission module case or integrally formed therewith. The dimensional relationship and the moving direction in FIG. 8 are the same as in FIG. 7.

Figure 9:
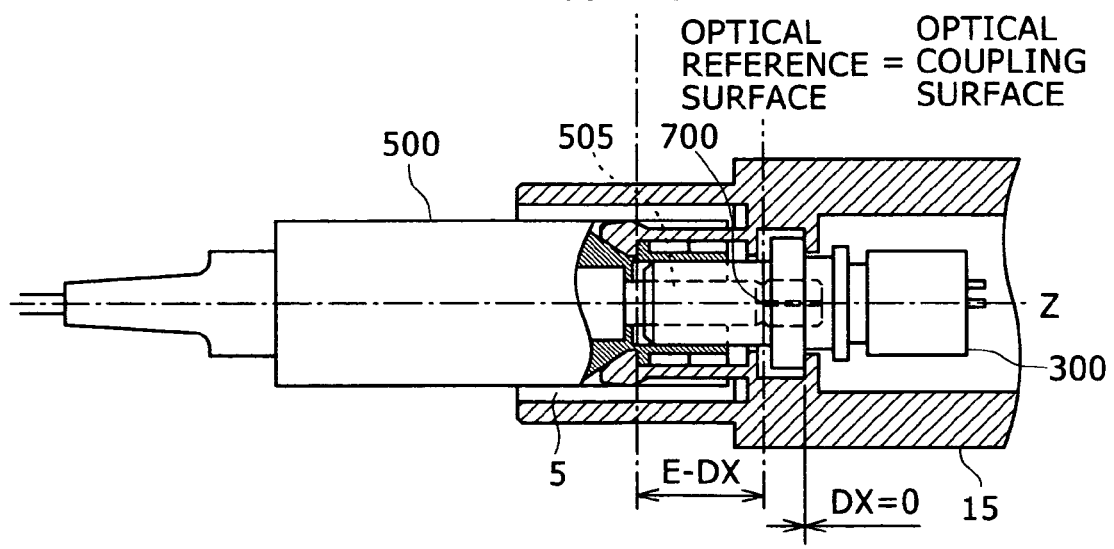
FIG. 9 is a partial cross-sectional view illustrating the state where an optical transmission plug is connected to the optical transmission module case storing the optical communication module.

FIG. 9 is a partial cross-sectional view illustrating the state where an optical transmission plug is connected to the optical transmission module case storing the optical communication module. In FIG. 9, the optical communication module 300 movable in the X, Y, Z and θxy directions is stored in the optical transmission module case 15 having the receptacle part 5 for connecting an optical transmission plug from the outside of the optical transmission module. The optical communication module 300 and the optical transmission module case 15 have the distance "DX". When an optical transmission plug 500 is connected through which light can be transmitted, the distance "DX" between the optical communication module 300 and the optical transmission module case 15 is zero. More specifically, "E-DX" is 7.0±0.1 mm. In the case where the outer shape accuracy of the optical transmission plug 500 or receptacle part 5 is fluctuated, the optical axis Z is corrected before the optical transmission plug 500 is completely inserted therein, so that a ferrule part 505 of the optical transmission plug 500 and the optical axis of the optical coupling surface 700 of the optical communication module 300 are aligned with each other.

Figure 10:
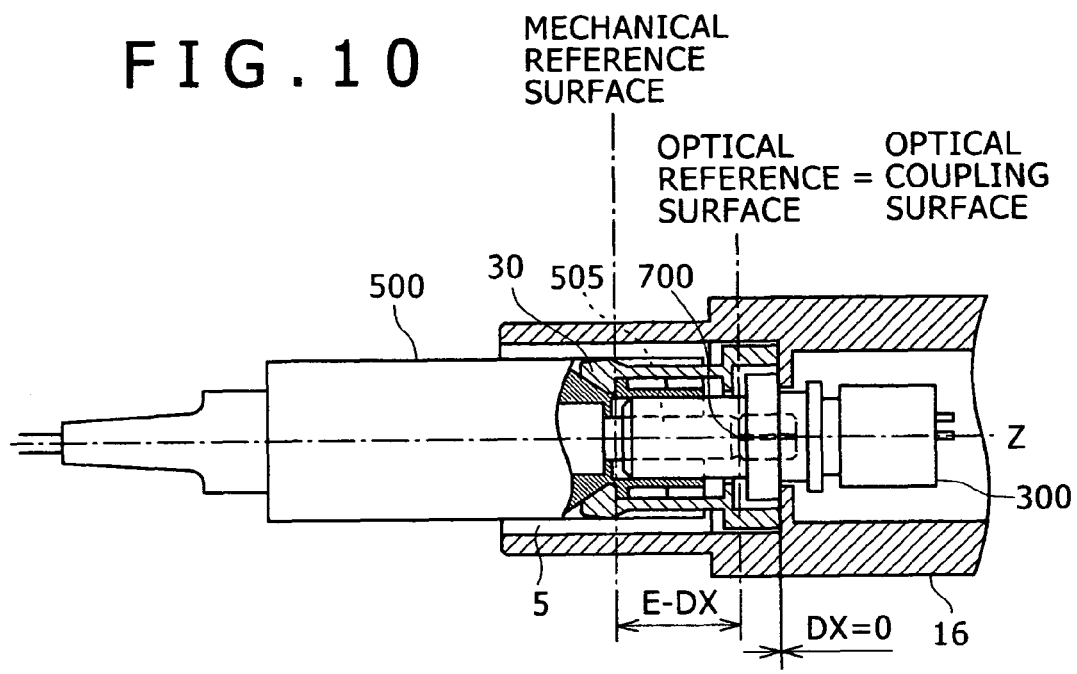
FIG. 10 is a partial cross-sectional view showing that the optical transmission plug is connected to the optical transmission module case storing the optical communication module and the hook part.

FIG. 10 is a partial cross-sectional view showing that the optical transmission plug is connected to the optical transmission module case storing the optical communication module and the hook part. In FIG. 10, the optical communication module 300 movable in the X, Y, Z and θxy directions is stored in the optical transmission module case 15 having the receptacle part 5 for connecting the optical transmission plug from the outside of the optical transmission module and the hook part 30 for holding the optical transmission plug. The optical communication module 300 and the hook part 30 have the distance "DX". When the optical transmission plug 500 is connected through which light can be transmitted, the distance "DX" between the optical communication module 300 and the optical transmission module case 15 is zero. More specifically, "E-DX" is 7.0 mm±0.1 mm. In the case where the outer shape accuracy of the optical transmission plug 500 or receptacle part 5 is fluctuated, the optical axis Z is corrected before the optical transmission plug 500 is completely inserted therein, so that the ferrule part 505 of the optical transmission plug 500 and the optical axis of the optical coupling surface 700 of the optical communication module 300 are aligned with each other.

According to the present embodiment, it is possible to maintain the optical coupling of the optical transmission module as long as the deformation amount of the hook is equal to or less than the amount with which the optical communication module and the case are in contact with each other, even if a tensile force to deform the hook is applied in the state where the optical transmission plug is inserted therein. Thus it is possible to obtain a receptacle-type optical transmission module that reduces the external influence of a tensile force on the optical fiber and maintains the coupling of light.

Embodiment 3

Figure 11:
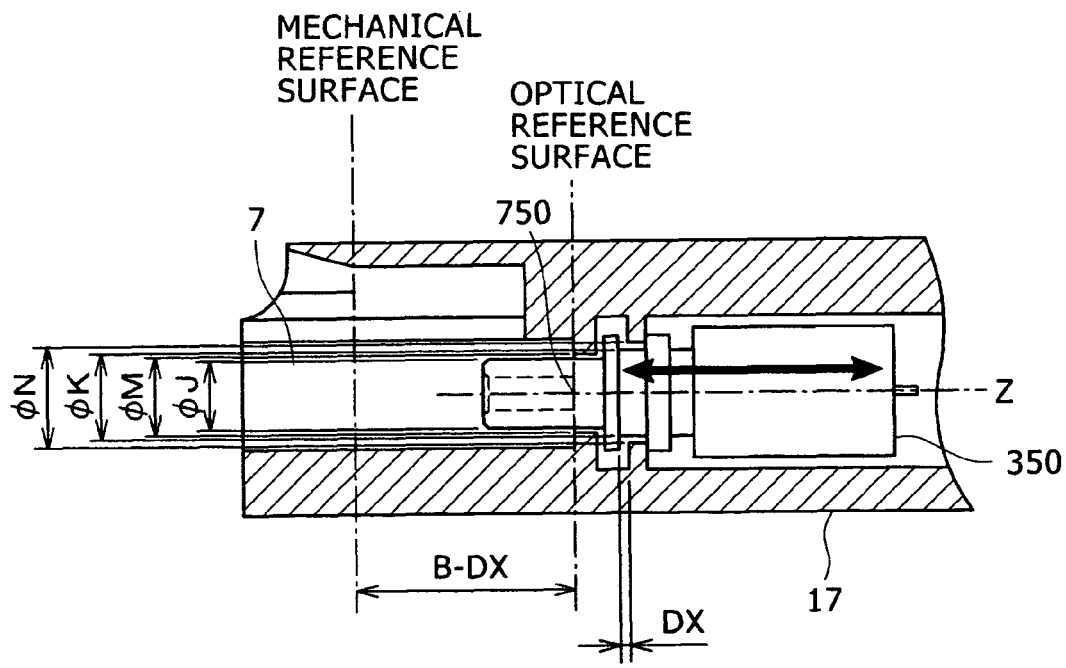
FIG. 11 is a partial cross-sectional view of an optical transmission module case storing the LC connector-type optical communication module which is movable in the Z direction.

FIG. 11 is a partial cross-sectional view of the optical transmission module case storing the LC connector-type optical communication module which is movable in the Z direction. In FIG. 11, the optical communication module 350 is stored in the optical transmission module case 17 having the receptacle part 7 for connecting the optical transmission plug from the outside of the optical transmission module. The optical communication module 350 and the optical transmission module case 17 have the distance "DX" in parallel to the Z-axis, as well as "φJ<φM" and "φK<φN" within the X-Y surface as the relations between the outer diameters of the optical communication module 350 and between the inner diameters of the transmission module case 17. As a result, the optical communication module 350 can move backward and forward along the Z-axis which is the optical axis direction. When the distance between the optical communication module 350 and the optical transmission module case 17 is "DX", the distance between the mechanical reference surface and optical coupling surface 750 is "B-DX".

According to the present embodiment, it is possible to maintain the optical coupling of the optical transmission module as long as the amount of Z-direction deformation of the hook is equal to or less than DX, even if a tensile force to deform the hook in the −Z direction is applied in the state where the optical transmission plug is inserted therein. Thus it is possible to obtain a receptacle-type optical transmission module that reduces the external influence of a tensile force on the optical fiber in the Z-direction and maintains the coupling of light.

Embodiment 4

Figure 12:
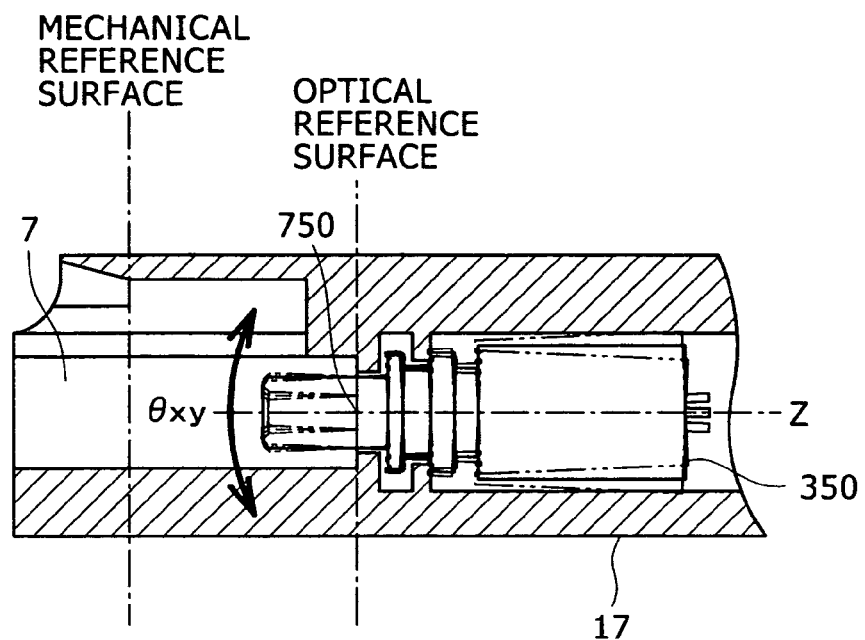
FIG. 12 is a partial cross-sectional view of the optical transmission module case storing the LC connector-type optical communication module which is movable in the X, Y, Z, and θxy directions.

FIG. 12 is a partial cross-sectional view of the optical transmission module case storing the LC connector-type optical transmission module which is movable in the X, Y, Z and θxy directions. In FIG. 12, the optical communication module 350 is stored in the optical transmission module case 17 having the receptacle part 7 for connecting the optical transmission plug from the outside of the optical transmission module. The optical communication module 350 and the optical transmission module case 17 have a distance. Compared with Embodiment 3, the value of the distance DX parallel to the Z-axis is increased and the values of "φM−φJ" and "φN−φK" are also increased. As a result, the optical communication module 350 can move in the X, Y directions that are orthogonal to the Z-axis as the optical axis, in the Z direction as the optical axis, and in the θxy direction as the rotation direction. These moving directions of the communication module are the connector direction than a surface perpendicular to the optical axis.

Figure 13:
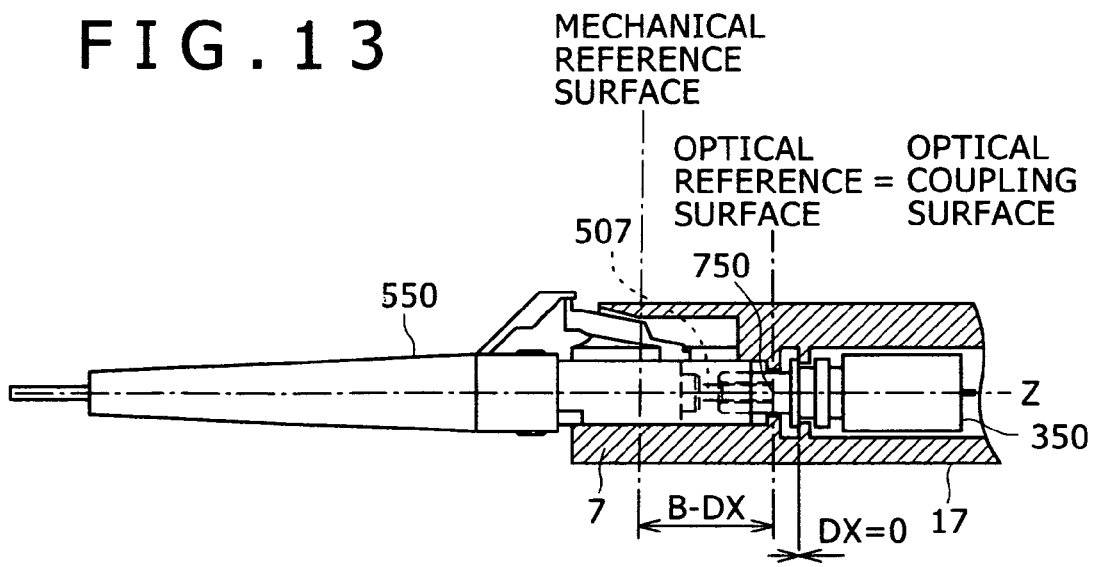
FIG. 13 is a partial cross-sectional view showing that an optical transmission plug is connected to the optical transmission module case storing the optical communication module for LC connector.

FIG. 13 is a partial cross-sectional view showing that an optical transmission plug is connected to the optical transmission module case storing the LC connector-type optical transmission module. In FIG. 13, the optical communication module 350 movable in the X, Y, Z and θxy directions is stored in the optical transmission module case 17 having the receptacle 7 for connecting the optical transmission plug from the outside of the optical transmission module. The optical communication module 350 and the optical transmission module case 17 have the distance "DX". However, when an optical transmission plug 550 is connected through which light can be transmitted, the distance "DX" between the optical communication module 350 and the optical transmission module case 17 is zero. More specifically, "B-DX" is 9.95±0.05 mm. In the case where the outer shape accuracy of the optical transmission plug 550 or receptacle part 7 is fluctuated, the optical axis Z is corrected before the optical transmission plug 550 is completely inserted therein, so that a ferrule part 507 of the optical transmission plug 550 and the optical axis of the optical coupling surface 750 of the optical communication module 350 are aligned with each other.

Figure 14:
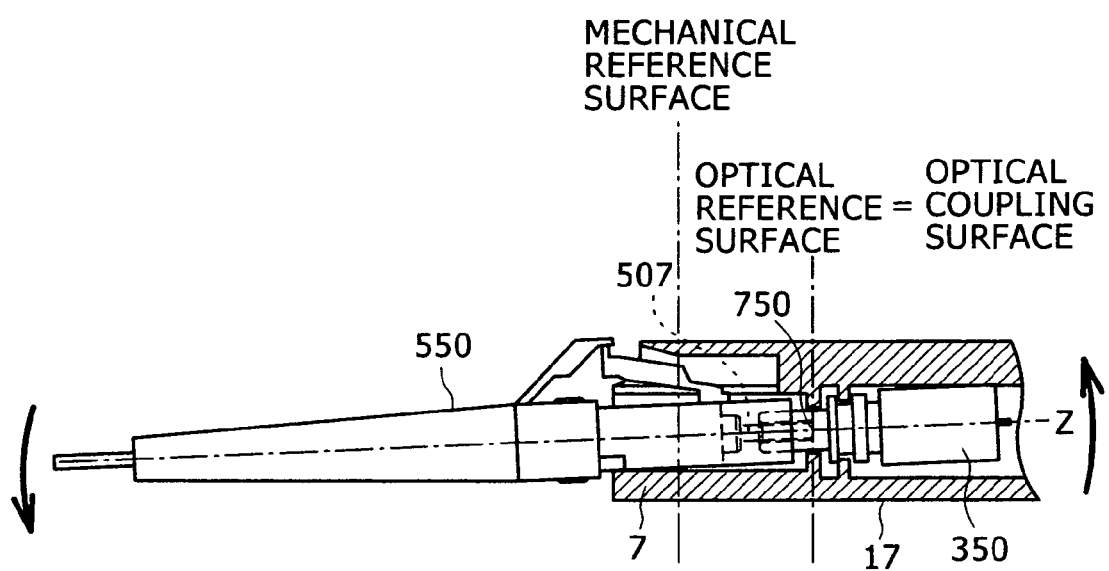
FIG. 14 is a partial cross-sectional view of the optical transmission plug to which a tensile force is applied and the optical transmission module.

FIG. 14 is a partial cross-sectional view of the optical transmission plug to which a tensile force is applied and the optical transmission module. In FIG. 14, the optical communication module 350 movable in the Z, X, Y and θxy directions is stored in the optical transmission module case 17 having the receptacle part 7 for connecting the optical transmission plug from the outside of the optical transmission module. The optical communication module 350 and the optical transmission module case 17 have a distance. When the tensile force is applied to the optical transmission plug 550 connected to the optical communication module 350, the ferrule 505 that is embedded in the optical transmission plug 550 or in the plug is inclined at the distance between the receptacle part 7 and the optical transmission plug 550. The optical communication module 350 freely movable in the X, Y, Z, and θxy directions follows the optical transmission plug 550. In this way the optical coupling surface 750 is maintained and thus the power for the optical transmission is maintained.

According to the present embodiment, it is possible to maintain the optical coupling of the optical transmission module as long as the deformation amount of the hook is equal to or less than the amount with which the optical communication module and the case are in contact with each other, even if a tensile force to deform the hook is applied in the state where the optical transmission plug is inserted therein. Thus it is possible to obtain a receptacle-type optical transmission module that reduces the external influence of a tensile force on the optical fiber and maintains the coupling of light.

According to the present invention, it is possible to provide a receptacle-type optical transmission module that reduces the external influence of a tensile force on the optical fiber and maintains the coupling of light of the optical transmitter module or optical receiver module.

We claim:

1. An optical transmission module comprising:
   a communication module for converting an electrical signal to an optical signal or converting an optical signal to an electrical signal;
   a case for holding the communication module and for positioning an optical plug which includes an optical fiber and a ferrule, and
   a coupling member for coupling the communication module to the optical plug,
   wherein the communication module is movably held within the case by the coupling member so that the communications module is spaced from an inner wall of the case and can move within the case without restraint by setting up predetermined distances including a Z direction which is an optical axis direction and X and Y directions which are orthogonal to the Z direction so that the coupling member and the case can move in and out of contact with each other, and wherein said communication module is movable without restraint in X, Y and Z directions and θxy directions which are rotation directions within the case,
   wherein, when said optical plug is connected to said communication module via the coupling member, the distance in the Z direction becomes zero, and said communication module is positioned by said ferrule of said optical plug, and
   wherein, when said optical fiber is applied with tensile force and said ferrule is applied with stress, said communication module moves without restraint in the X, Y, Z and θxy directions and follows movement of the ferrule.

2. The optical transmission module according to claim 1, wherein said optical plug is comprised of an SC connector.

3. The optical transmission module according to claim 1, wherein said optical plug is comprised of an LC connector.

4. The optical transmission module according to claim 1, wherein said communication module is comprised of an optical transmitter module.

5. The optical transmission module according to claim 1, wherein said communication module is comprised of an optical receiver module.

* * * * *